July 26, 1932.  D. M. FERGUSON ET AL  1,869,191
FRONT WHEEL DRIVE AUTOMOBILE
Filed Aug. 12, 1931

INVENTOR:
DONALD M. FERGUSON.
EDWIN R. MAURER.
BY
ATTORNEYS.

Patented July 26, 1932

1,869,191

UNITED STATES PATENT OFFICE

DONALD M. FERGUSON, OF HIGHLAND PARK, AND EDWIN R. MAURER, OF DETROIT, MICHIGAN, ASSIGNORS TO WILCOX-RICH CORPORATION, OF DETROIT, MICHIGAN, A CORPORATION OF MICHIGAN

FRONT WHEEL DRIVE AUTOMOBILE

Application filed August 12, 1931. Serial No. 556,531.

This invention relates to front-wheel-drive automobiles, and more particularly to an improved transmission mechanism, whereby the power of the motor is transmitted to the propeller shaft which extends forwardly from the transmission and drives the front axle mechanism.

It is one of the objects of the invention to provide an improved form of transmission mechanism that will be compact and have the final drive at the forward end of the transmission, so as to reduce the overhang and also reduce the stresses on the transmission housing and its support.

Figure 1:
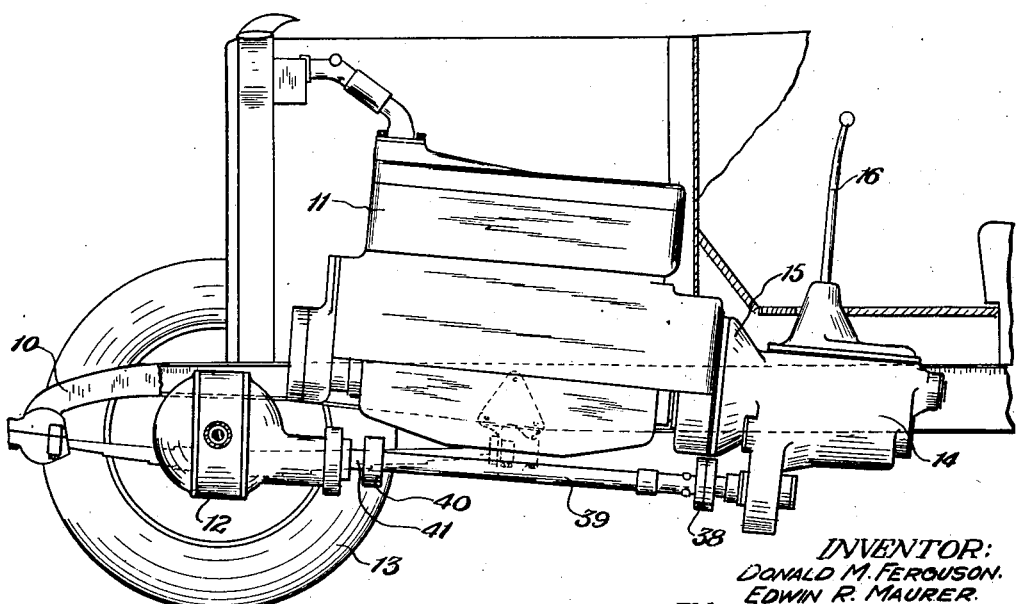

Other objects of the invention and the features of novelty will be apparent from the following description, taken in connection with the accompanying drawing, of which Figure 1 is an elevation of the front end of an automobile embodying our invention.

Figure 2:
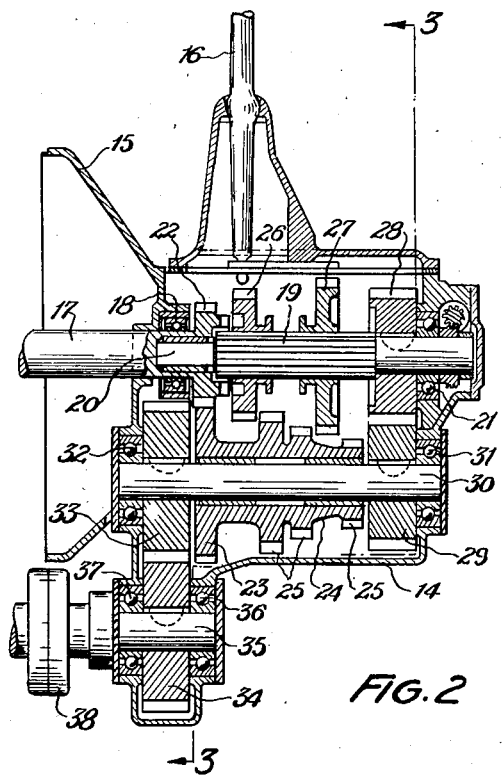
Figure 3:
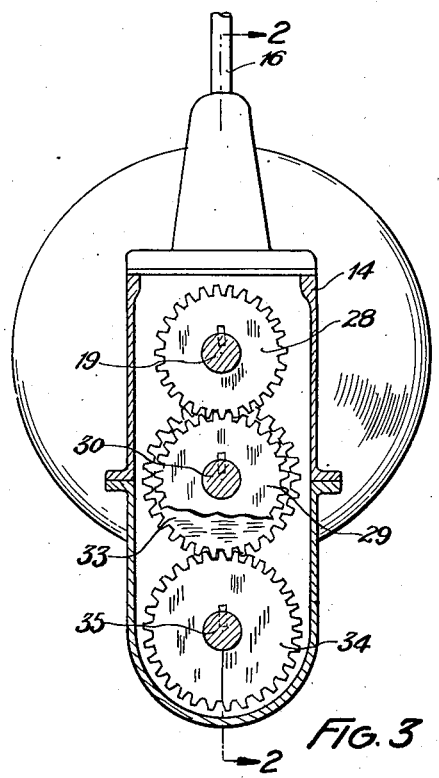

Fig. 2 is an enlarged longitudinal section through the transmission mechanism, and Fig. 3 is a transverse section on the line 3—3 of Fig. 2.

Referring to the drawing, 10 indicates one of the side members of the automobile frame and 11 a motor which may be supported on the frame according to the conventional practice. The front driving axle is indicated at 12 and one of the front wheels, driven thereby, is indicated at 13. The transmission housing is shown at 14 and is provided with the usual bell 15, at its forward end, by which the transmission housing is secured to the rearward end of the motor 11. The usual gear shift lever is indicated at 16.

A driving shaft 17, which may be driven from the motor 11, by means of a clutch (not shown), according to conventional practice, has its rearward end supported in a bearing 18 that is mounted in a wall of the housing 14. A splined shaft 19 is provided, at its forward end, with a pilot 20, which is supported in a bearing in the shaft 17 according to conventional practice, the rearward end of the shaft 19 being supported in a bearing 21 in the rear wall of the housing 14.

The shaft 17 is provided with a gear 22 which meshes with the gear 23 of the tubular shaft 24 which also carries the change-speed gears 25. On the splined shaft 19 there are sliding gears 26 and 27, which may be shifted by the lever 16, according to conventional practice to effect the various changes in speed of the shaft 19 relative to the driving shaft 17.

The shaft 19 carries, within the housing 14 and adjacent its rearward end, a gear 28 which is keyed or otherwise secured thereto so as to be driven thereby. The gear 28 meshes with a gear 29 that is keyed or otherwise secured to a counter-shaft 30, which has its opposite ends supported in the housing 14 by means of the bearings 31 and 32. The tubular shaft 24 is rotatably supported on the shaft 30, and the latter has keyed thereto, forwardly of the tubular shaft 24, a gear 33 which meshes with a gear 34 that is keyed or otherwise secured to the stub shaft 35. The shaft 35 is arranged below the shaft 30, and is supported in an extension of the housing 14 by means of bearings 36 and 37. The forward end of the shaft 35 is connected, through a universal joint 38, with the propeller shaft 39 and the forward end of this propeller shaft is connected, through a universal joint 40, with the driving or pinion shaft 41 of the axle 12.

The arrangement of the shaft 35 at the forward end of the housing 14 and adjacent the bell 15, provides a construction in which the overhang is reduced to a minimum, and hence the torque reactions on the housing 14 will be minimized. In addition, the arrangement of the shaft 24 between the gears 29 and 33, provides a substantial support for this shaft and a compact arrangement of the gearing which also insures that all of the working parts will be thoroughly lubricated by the body of lubricant that is provided within the housing 14 in accordance with conventional practice.

Having thus described our invention, we claim:

1. In a front-wheel-drive automobile, the combination of a front driving axle, a motor, a shaft driven by the motor, a hollow counter shaft having change-speed gears thereon and driven from the first-mentioned shaft, a splined shaft arranged in axial alignment with the first-mentioned shaft and having sliding gears thereon adapted to be selectively meshed with the gears on said counter shaft so that said splined shaft may be driven at different speeds relative to the first-mentioned shaft, a driven shaft extending through said counter shaft and on which the latter is supported, a pair of gears whereby said driven shaft is driven from said splined shaft, a stub shaft arranged below said driven shaft and driven therefrom by a pair of gears, and a propeller shaft extending forwardly from said stub shaft and operatively connected with said axle.

2. In a front-wheel-drive automobile, the combination of a front driving axle, a motor, a shaft driven by the motor, a transmission housing, a shaft supported at its ends in said housing below the first-mentioned shaft, a splined shaft in axial alignment with the first-mentioned shaft, gears on the rearward portions of said splined shaft and the second-mentioned shaft and whereby the latter shaft is driven from said splined shaft, a hollow counter shaft rotatably mounted on the second-mentioned shaft forwardly of the last-mentioned gears and having a plurality of change speed gars, a pair of gears whereby said counter shaft is driven from the first-mentioned shaft, sliding gears on said splined shaft adapted to be selectively meshed with said change speed gears, a stub shaft mounted below the second-mentioned shaft and driven therefrom by a pair of gears arranged forwardly of said counter shaft, and a propeller shaft extending forwardly from said stub shaft and operatively connected with said axle.

3. In a transmission for front-wheel-drive automobiles, a driving shaft, a splined shaft in alignment with said driving shaft, a shaft below said splined shaft and having a hollow counter shaft rotatably mounted thereon, said counter shaft having a plurality of change speed gears thereon, sliding gears on said splined shaft adapted to be selectively meshed with said change speed gears, a pair of gears for driving said counter shaft from said driving shaft, a pair of gears arranged rearwardly of said change speed gears and whereby the third-mentioned shaft is driven from said splined shaft, and a stub shaft arranged below the third-mentioned shaft and driven therefrom by a pair of gears arranged forwardly of said change speed gears.

4. In a transmission for front-wheel-drive automobiles, the combination of a driving shaft, a second shaft arranged in alignment with said driving shaft, a third shaft below the second shaft and driven therefrom, a stub shaft below said third shaft and driven therefrom, a hollow counter shaft rotatably mounted on said third shaft and having a plurality of change speed gears, gears of said second shaft adapted to be operatively connected with said change speed gears selectively, means for driving said counter shaft from said driving shaft, and means whereby said second shaft may be directly driven from said driving shaft.

In testimony whereof, we hereunto affix our signatures.

DONALD M. FERGUSON.
EDWIN R. MAURER.